United States Patent
Fellenstein et al.

(10) Patent No.: US 7,337,150 B2
(45) Date of Patent: Feb. 26, 2008

(54) PER-UNIT METHOD FOR PRICING DATA PROCESSING SERVICES

(75) Inventors: Craig William Fellenstein, Brookfield, CT (US); Campbell Victor Barford Watts, Killarney Heights (AU)

(73) Assignee: International Business Machines Corporation, Armonk, NY (US)

( * ) Notice: Subject to any disclaimer, the term of this patent is extended or adjusted under 35 U.S.C. 154(b) by 1130 days.

(21) Appl. No.: 10/053,843

(22) Filed: Jan. 22, 2002

(65) Prior Publication Data

US 2003/0140013 A1    Jul. 24, 2003

(51) Int. Cl.
*G06Q 99/00*    (2006.01)

(52) U.S. Cl. ............................ 705/400; 705/1; 705/10; 705/34

(58) Field of Classification Search .................... 705/1, 705/7–9, 400, 34, 10
See application file for complete search history.

(56) References Cited

U.S. PATENT DOCUMENTS

| | | | |
|---|---|---|---|
| 5,500,793 A | 3/1996 | Deming, Jr. et al. | 364/401 |
| 5,745,884 A | 4/1998 | Carnegie et al. | 705/34 |
| 5,764,984 A | 6/1998 | Loucks | 395/682 |
| 5,852,812 A | 12/1998 | Reeder | 705/39 |
| 5,943,657 A | 8/1999 | Freestone et al. | 705/400 |
| 6,119,109 A | 9/2000 | Muratani et al. | 705/400 |
| 6,208,977 B1 | 3/2001 | Hernandez et al. | 705/34 |
| 6,338,043 B1* | 1/2002 | Miller | 705/14 |
| 6,938,007 B1* | 8/2005 | Iulianello et al. | 705/34 |
| 7,149,700 B1* | 12/2006 | Munoz et al. | 705/8 |
| 2002/0040334 A1* | 4/2002 | Yamazaki | 705/34 |
| 2002/0120508 A1* | 8/2002 | Matsumoto et al. | 705/14 |
| 2002/0161600 A1* | 10/2002 | Stubiger et al. | 705/1 |
| 2003/0070157 A1* | 4/2003 | Adams et al. | 717/101 |

FOREIGN PATENT DOCUMENTS

JP    2000339147 A   * 12/2000
WO    97/20264          6/1997

OTHER PUBLICATIONS

Knight, Robert, "EDI Hitting Stride in Data Entry", Feb. 1992, Software Magazine, vol. 12, Iss. 6; Part 2. p. 23, 2 pgs.*

(Continued)

*Primary Examiner*—John W. Hayes
*Assistant Examiner*—Freda A Nelson
(74) *Attorney, Agent, or Firm*—Anna L. Linne; Greenblum & Bernstein, P.L.C.

(57) ABSTRACT

Data processing services are offered on a per-unit basis, where a unit is, for example, an application program running on a server. Environmental complexity, level of change, and type of environment are determined for each unit of the services and points are assigned. The points are summed to give a count of points for each unit, and the counts of points are summed to provide a total number of points. A baseline price for the services is divided by the total number of points to provide a per-point price. The price of any unit may then be determined by multiplying its count of points by the per-point price. When a new unit is added in, its count of points is determined. The baseline price is then adjusted by multiplying the count of points for the new unit by the per-point price, and adding the result to the previous baseline.

18 Claims, 3 Drawing Sheets

OTHER PUBLICATIONS

Cruz, J. et al. "Method of Providing Rate Information for Multiple Networks", IBM Technical Disclosure Bulletin, vol. 37, No. 11, pp. 551-552, Nov. 1994.

Temoshenko, L. "Method for Manager-Agent Accounting Data Interpretation", IBM Technical Disclosure Bulletin, vol. 37, No. 2B, pp. 463-466, Feb. 1994.

* cited by examiner

PER-UNIT METHOD FOR PRICING DATA PROCESSING SERVICES

FIELD OF THE INVENTION

The present invention concerns the field of data processing services, and more particularly concerns a per-unit method for pricing data processing services such as application programs executed by servers.

BACKGROUND

In the past, determining the price of data processing services has been relatively straightforward. For example, in the mainframe environment, prices have been based on the capability of equipment as measured by the execution of millions of instructions per second (MIPS); in the desktop environment, prices have been set according to the number of "seats" supported, i.e., according to the maximum number of users permitted to access a particular program or service simultaneously.

Neither of these measures, however, is entirely satisfactory in today's emerging mid-range environment where system integrators provide turn-key data processing services that may involve computer equipment, servers, applications, and communications. Such data processing services are now laboriously priced, offering by offering, according to the specific technologies and platforms involved.

Unfortunately, when the customer's needs change, the price must be laboriously adjusted, based on changes in the technologies and platforms that underlie the data processing services. Not only are price updates laborious and therefore costly, they are also time consuming, and introduce delays that seem to make the system integrator unresponsive to "what if?" questions posed by customers. Further, customers are unable to see immediate relationships between changes in services and changes in prices, and instead often perceive only the anomalies introduced by technology shifts. Thus, today price is linked disadvantageously with technology rather than linked with the actual service provided by the system integrator. Such a link of service price to technology will ultimately fail when technology changes.

Thus there is a need for an improved way of pricing data processing services provided by system integrators, so that changes to baseline prices may be made quickly, inexpensively, and accurately, independently of technology changes, so that customers of system integrators are able to see relationships between changes in services and changes in prices.

SUMMARY

The present invention provides a unit-based method for changing the baseline price of data processing services offered by a system integrator so that the system integrator may respond quickly, inexpensively, and accurately to customer requests, independently of technology changes, so that customers may see relationships between changes in services and changes in prices.

Here, a "unit" has the nature of an application running on a server. Exemplary units are the family of mySAP programs and other application programs by SAP AG of Walldorf, Germany, and Newtown Square, Pa., and application programs by PeopleSoft, Inc. of Pleasanton, Calif., along with the physical and logical resources needed to support such application programs.

According to one aspect of the invention, data processing services may be offered on a per-unit basis, where the price of a unit is determined by a count of points for the unit and a per-point price. To determine the per-point price, level of environmental complexity, level of change, and type of environment are determined for each unit of the data processing services. Points are assigned accordingly. For example, there may be three levels of environmental complexity (simple, medium, and complex), three levels of change (low, medium, and high), and three types of environments (support, development, and production), each of which is associated with a predetermined number of points. The numbers of points are summed to give a count of points for each unit of the data processing services, and the counts of points for all the units are summed to provide a total number of points.

As a preliminary step, a baseline price for the data processing services is computed conventionally by the system integrator, for example upon initial provisioning of the data processing services based on hardware, platform, communication, and license costs. The baseline price is then divided by the total number of points, to provide a per-point price.

The price of a particular unit of the data processing services may then be determined using the per-point price, for example by determining the count of points for the particular unit and multiplying the count of points by the per-point price. Thus the price of each unit may be split-out from the baseline price for study by the customer. When a new unit is to be added to the data processing services, a count of points is determined for the new unit. An adjustment to the baseline price is then computed, for example by multiplying the count of points for the new unit by the established per-point price. The baseline price is then adjusted accordingly, for example by adding the adjustment to the old baseline price, to provide a new baseline price.

Thus the invention enables prices to be specified for each unit of service of the data processing services, so that the customer may understand and compare the prices of various units. Further, when the customer requests additional units, or poses "what if?" questions, a new-unit price and a new baseline prices may be determined quickly, inexpensively, and accurately, independently of the technology involved. These and other aspects of the present invention will be appreciated more fully when considered in light of the following detailed description and drawings.

DETAILED DESCRIPTION

The present invention includes a way of pricing data processing services provided by system integrators, so that changes to baseline prices may be made quickly, inexpensively, and accurately, independently of changes to the technology involved, and so that customers of system integrators are able to see relationships between changes in service and changes in prices.

Figure 1:
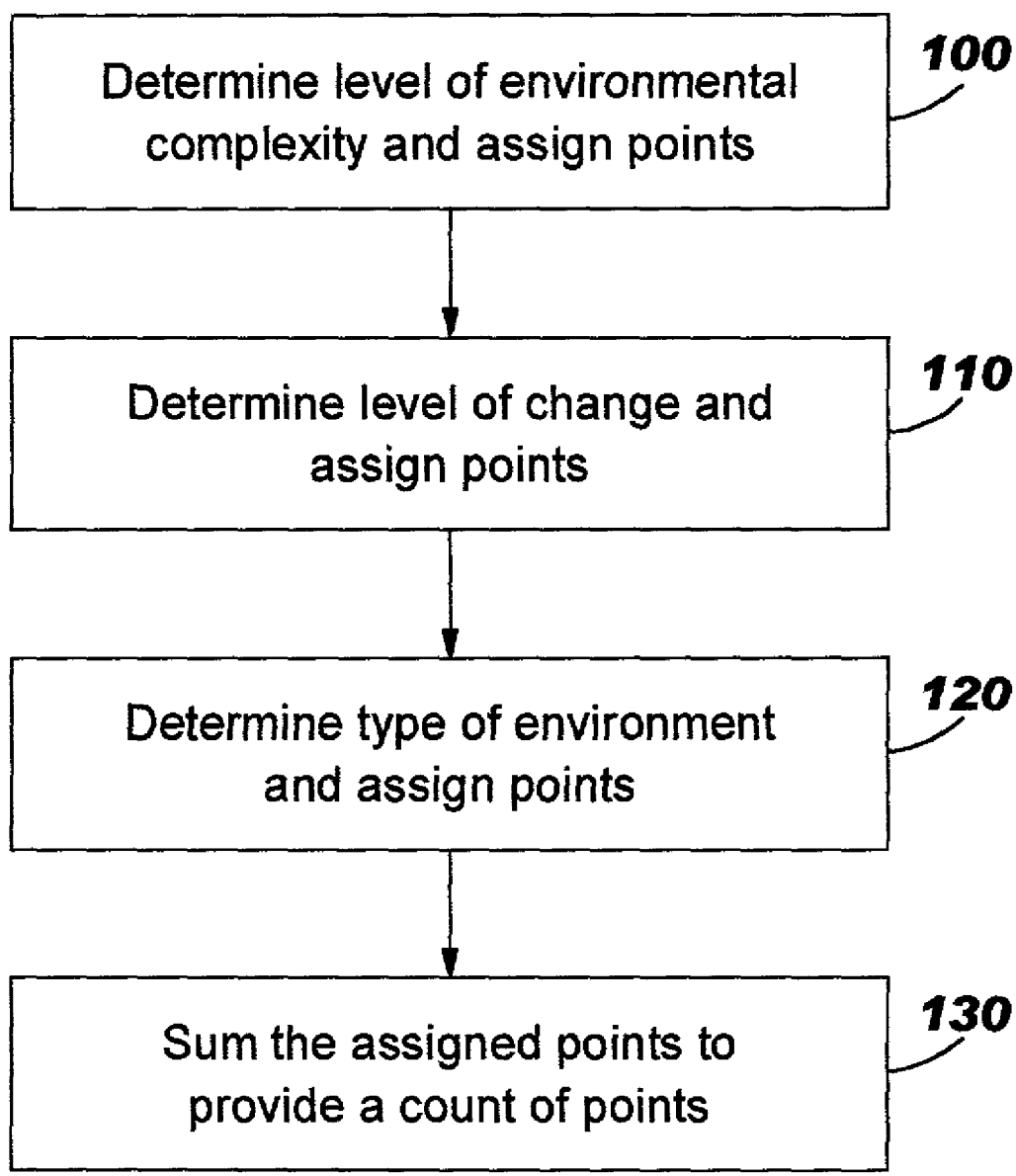
FIG. 1 is an exemplary flow chart that shows a way of determining a count of points for a unit of data processing services.

FIG. 1 is an exemplary flow chart that shows a way of determining a count of points for a unit of data processing services. In the context of describing the present invention, a unit has the nature of an application program running on a server, and may be described generally as a set of application functions associated with, or delivered by, a single system or a set of systems. A system includes the necessary physical and logical resources, and may include processors, memory, operating systems, tools, and application programs. Exemplary units are the family of mySAP programs and other application programs by SAP AG of Walldorf, Germany, and Newtown Square, Pa., and application programs by PeopleSoft, Inc. of Pleasanton, Calif., and the necessary physical and logical resources to support these application programs (SAP and mySAP may be trademarks or registered trademarks of SAP AG).

For the unit in question, its level of environmental complexity is determined and an appropriate number of points assigned (step 100), the level of change is determined and an appropriate number of points assigned (step 110), and the type of environment is determined and an appropriate number of points assigned (step 120). The assigned points are summed, to provide a count of points for the unit (step 130).

In the context of the present invention, an environment is the infrastructure needed to deliver the data processing services. An environment may exist across multiple hosts, or several environments may share a single host.

Environmental complexity may be characterized by selecting a level of environmental complexity from a plurality of predetermined levels of environmental complexities. In a preferred embodiment of the invention, the level of environmental complexity is selected from the set: simple, medium, complex. A simple environment contributes one point to the unit's count of points, a medium complexity environment contributes four points, and a complex environment contributes eight points.

Simple environments include general administration, problem and change, operations, operations support for new services, software asset management, DASD under 100 GB, and 13-hour-per-day-five-days-per-week support. Medium complexity environments include configuration planning, hardware and technical support, backup and recovery, current release levels, production control and scheduling, storage management/tape operations and administration, capacity planning, investment gating, performance monitoring, security, build, offsite storage, print operations, operations documentation, DASD from 100 GB to 1 TB, and continuous support (24 hours, seven days per week). Complex environments include application support, database administration and support, technical architecture planning, data center planning, acceptance and operability, and DASD over 1 TB.

Level of change may be selected from a plurality of predetermined levels of change. In a preferred embodiment of the invention, the level of change is selected from the set: low, medium, and high. A low level of change contributes one point to the unit's count of points, a medium level of change contributes six points, and a high level of change contributes fourteen points.

Generally, a change is an interaction initiated by the customer requiring a change request to the system integrator, and results, for example, in a problem record. In a preferred embodiment of the invention, changes are tracked through a change-and-problem tracking tool such as the Tivoli Service Desk by IBM, or may be forecast when initial data is unavailable (Tivoli and IBM are registered trademarks of the IBM Corporation, Armonk, N.Y.). Seventeen or fewer changes per month constitute a low level of change, between eighteen and thirty (inclusive) changes per month constitute a medium level of change, and more than thirty changes per month constitute a high level of change. Changes attributable to acts initiated by the system integrator for the benefit of the system integrator may be excluded from the determination of the level of change.

Type of environment may be selected from a plurality of predetermined types of environments. In a preferred embodiment of the invention, the type of environment is selected from support; development, test, or data warehouse (for convenience called simply a "development environment" hereinbelow); and production or disaster recovery (for convenience called simply a "production environment" hereinbelow). A support environment contributes 1.5 points to the unit's count of points; a development environment contributes four points; and a production environment contributes 5.5 points.

Support environments typically involve backup servers, performance-management or capacity-management servers, monitoring servers, and so forth. Development environments typically involve development, testing, or business intelligence applications. Production environments typically involve production or disaster recovery applications and associated gateways.

For example, a unit might be a performance monitoring application, requiring ten changes per month, in a production environment. This exemplary unit would be characterized as having medium environmental complexity, low level of change, and complex type of environment. The medium environmental complexity would contribute four points to the unit's count of points, the low level of change would contribute one point, and the complex type of environment would contribute 5.5 points. Thus the count of points for the exemplary unit would be 10.5 points.

Figure 2:
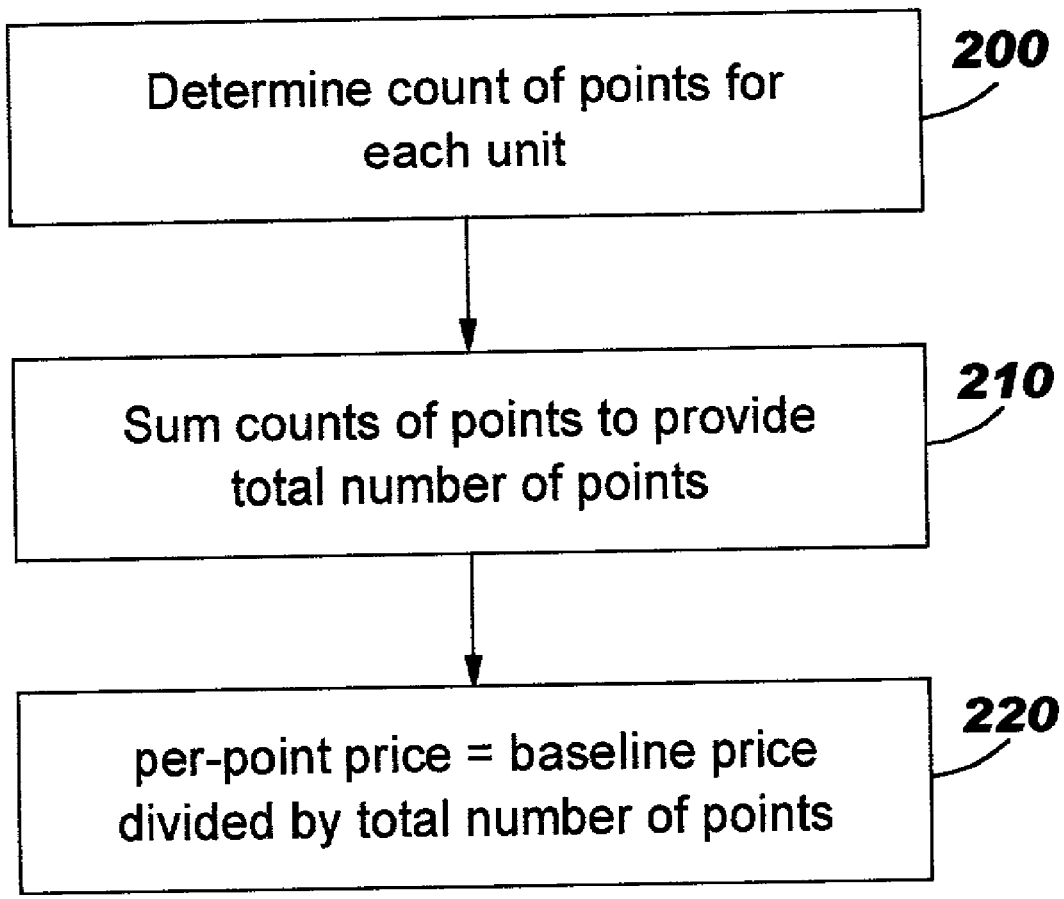
FIG. 2 is an exemplary flow chart that shows a way of determining a per-point price for data processing services, based on counts of points.

FIG. 2 is an exemplary flow chart that shows a way of determining a per-point price for data processing services. A count of points is determined for each unit of the data processing services (step 200), as described above. The counts of points for all of the units that make up the data processing services are then summed (step 210), to provide a total number of points. The total number of points is then divided into the baseline price of the data processing services (step 220) to provide a per-point price. For example, the data processing services might consist of five units, with respective counts of points: 10, 15, 12, 24, and 17. The total number of points would then be 78. If the baseline price were $780,000 per month, the per-point price would be $10,000 per month.

The baseline price may be determined conventionally, for example by the laborious method of costing-out the various platforms, hardware elements, applications, licenses, communication fees, and so forth. Typically, this may be done by first determining a set of services, or a solution, that satisfies the customer's requirements, and then pricing that set of services or solution by identifying the component parts, pricing each component individually, and summing the individual component prices.

Figure 3:
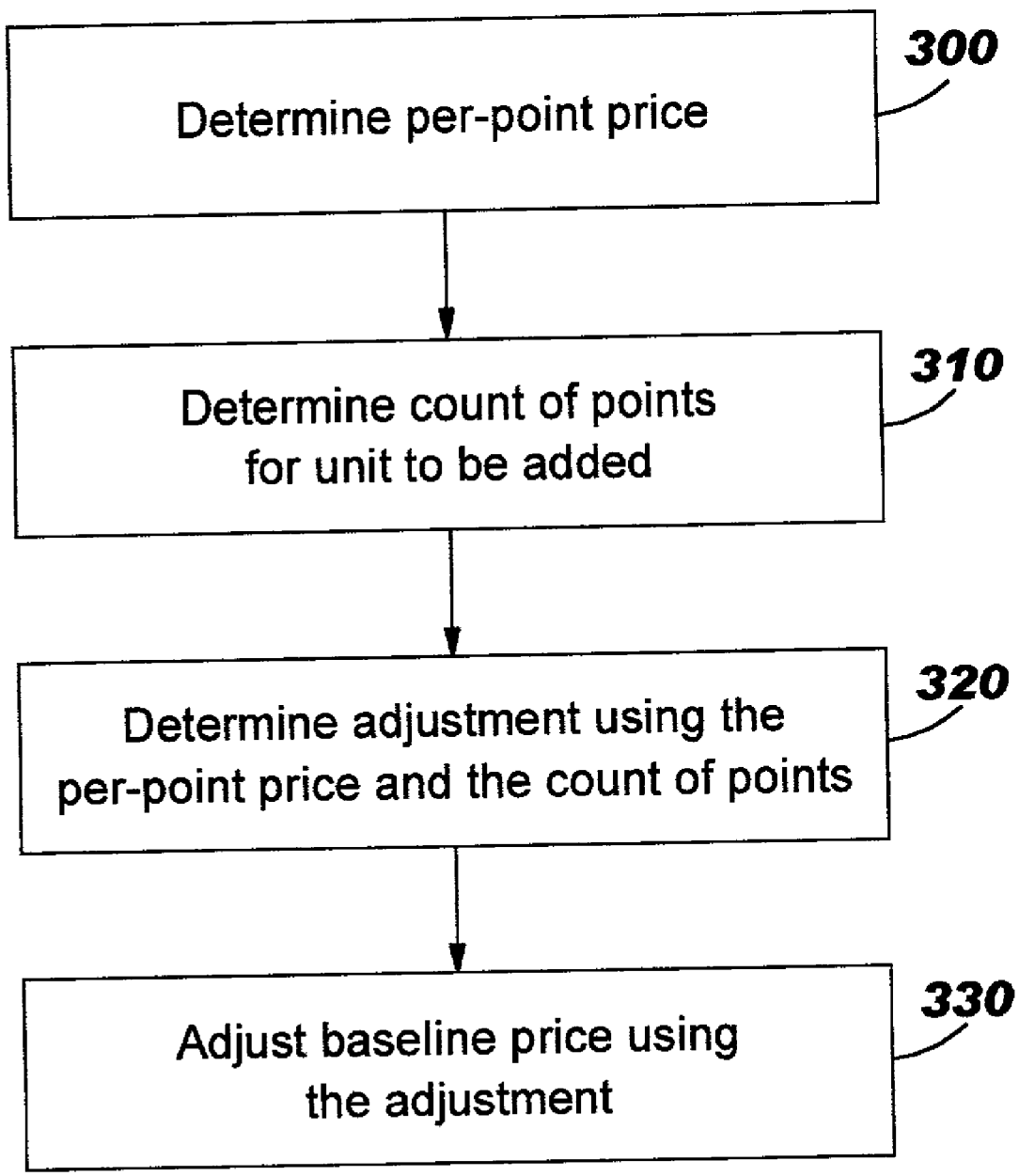
FIG. 3 is an exemplary flow chart that shows a way of adjusting a baseline price for data processing services when a new unit is added.

FIG. 3 is an exemplary flow chart that shows a way of adjusting the baseline price for data processing services when a new unit is added. The per-point price is determined as explained above (step 300), and a count of points for the unit to be added is determined as explained above (step 310). An adjustment to the baseline price is then determined (step 320) using the per-point price and the count of points for the unit to be added, for example by multiplying the per-point price by the count of points for the unit to be added. The baseline price is then adjusted (step 330) using the adjustment, for example by adding the adjustment to the old baseline price to provide a new baseline price. An analogous method may be applied to adjust the baseline price when a unit is removed from the data processing services.

In the example introduced above, suppose further than a new unit is to be added, where the new unit is a general administration application (simple complexity, one point), requiring three changes per month (low level of change, one point), operating in the production environment (complex type of environment, 5.5 points). The count of points for the unit to be added would then be 7.5 points. In this example, the hypothetical per-point price is $10,000 per month. Consequently, the exemplary adjustment to the baseline price would be $75,000 per month, and the new baseline price would be $855,000 per month.

From the foregoing description, those skilled in the art will appreciate that the present invention provides a way of pricing data processing services provided by system integrators, so that changes to baseline prices may be made quickly, inexpensively, and accurately, independently of changes to the technology involved, so that customers of system integrators are able to see the relationship between changes in services and changes in prices. The foregoing description, however, is illustrative rather than limiting. In particular, the invention is not limited by the numerical values used here for illustrative purposes. Rather, the invention is limited only by the claims that follow.

We claim:

1. A method for determining a per-point price for data processing services using a computing device, comprising the steps of:

for each unit of a plurality of units of data processing services, determining a level of environmental complexity, a level of change, and a type of environment;

for each unit of the plurality of units, assigning points responsive to each of level of environmental complexity, level of change, and type of environment, as determined; and summing the assigned points to provide a count of points for the unit;

summing the counts of points for all the units of the plurality of units to provide a total number of points for the data processing services;

dividing a baseline price for the data processing services by the total number of points to provide a per-point price; and one of:

responding to a customer request by providing the per-point price for data processing services; and specifying to a customer the per-point price for data processing services.

2. The method of claim 1, wherein the step of determining further includes a step of selecting the level of environmental complexity from a plurality of predetermined levels of environmental complexity.

3. The method of claim 2, wherein the predetermined levels of environmental complexity include simple, medium, and complex.

4. The method of claim 1, wherein the step of determining further includes a step of selecting the level of change from a plurality of predetermined levels of change.

5. The method of claim 4, wherein the predetermined levels of change include low, medium, and high.

6. The method of claim 1, wherein the step of determining further includes a step of selecting the type of environment from a plurality of predetermined types of environments.

7. The method of claim 6, wherein the predetermined types of environments include support, development, and production.

8. A method for determining a per-point price for data processing services using a computing device, comprising the steps of:

for each unit of a plurality of units of data processing services, selecting a level of environmental complexity from a plurality of predetermined levels of environmental complexity, selecting a level of change from a plurality of predetermined levels of change, and selecting a type of emviromental from a plurality of predetermined types of environments;

for each unit of the plurality of units, assigning points responsive to each of selected level of environmental complexity, level of change, and type of environmental, and summing the assigned points to provide a count of points for the unit;

summing the counts of points for all the units of the plurality of units to provide a total number of points for the data processing services;

dividing a baseline price for the data processing services by the total number of points to provide a per-point price; and one of:

responding to a customer request by providing the per-point price for data processing services; and specifying to a customer the per-point price for data processing services.

9. The method of claim 8, wherein the predetermined levels of environmental complexity include simple, medium, and complex; wherein the predetermined levels of change include low, medium, and high; and wherein the predetermined types of environments include support, development, and production.

10. A method for adjusting a baseline price of data processing services when a unit is added using a computing device, comprising the steps of:

determining, from a baseline price, a per-point price for data processing services;

determining a level of environmental complexity, a level of change, and a type of environmental for a unit to be added to data processing services;

determining a count of points for the unit to be added, using each of the level of environmental complexity; level of change, and type of environment;

determining an adjustment of the baseline price for adding the unit, using the per-point price and the count of points for the unit; and adjusting the baseline price using the adjustment;

and one of: responding to a customer request by providing the per-point price for data processing services; and specifying to a customer the per-point price for data processing services.

11. The method of claim 10, wherein the step of determining a per-point price further includes the steps of:

for each unit of a plurality of units of the data processing services, selecting the level of environmental complexity from a plurality of predetermined levels of environmental complexity, selecting the level of change from a plurality of predetermined levels of change, and selecting the type of environment from a plurality of predetermined types of environments;

for each unit of the plurality of units, assigning points to the unit responsive to its level of environmental complexity, level of change, type of environment, as selected, and summing the assigned points to provide a count of points for the unit;

summing the counts of points for all the units of the plurality of units to provide a total number of points; and dividing the baseline price by the total number of points to provide the per-point price.

12. The method of claim 10, wherein the step of determining the adjustment to the baseline price further includes a step of multiplying together the count of points for the unit to be added and the per-point price.

13. The method of claim 1, wherein the method comprises responding to the customer request by providing the per-point price for data processing services.

14. The method of claim 1, wherein the method comprises specifying to the customer the per-point price for data processing services.

15. The method of claim 8, wherein the method comprises responding to the customer request by providing the per-point price for data processing services.

16. The method of claim 8, wherein the method comprises specifying to the customer the per-point price for data processing services.

17. The method of claim 10, wherein the method comprises responding to the customer request by providing the per-point price for data processing services.

18. The method of claim 10, wherein the method comprises specifying to the customer the per-point price for data processing services.

* * * * *